United States Patent [19]

Kurtz

[11] 4,406,993

[45] Sep. 27, 1983

[54] OIL FILLED PRESSURE TRANSDUCERS

[75] Inventor: Anthony D. Kurtz, Englewood, N.J.

[73] Assignee: Kulite Semiconductor Products, Inc., Ridgefield, N.J.

[21] Appl. No.: 297,093

[22] Filed: Aug. 28, 1981

[51] Int. Cl.³ .......................................... H01L 10/10
[52] U.S. Cl. ..................................................... 338/42
[58] Field of Search ................. 338/42, 4, 36; 73/720, 73/721, 726, 727, 753, 754, DIG. 4

[56] References Cited

U.S. PATENT DOCUMENTS 2,577,576  12/1951  Glickman .................... 174/152 GM
3,753,196  8/1973   Kurtz ............................. 338/4

FOREIGN PATENT DOCUMENTS 749540     12/1966  Canada ....................... 174/152 GM
54-153684  12/1979  Japan ............................ 73/727
55-2938240 3/1980   Japan ............................ 73/727
764241     12/1956  United Kingdom ....... 174/152 GM Primary Examiner—C. L. Albritton
Attorney, Agent, or Firm—Arthur L. Plevy

[57] ABSTRACT

An oil filled pressure transducer has a housing which has a top peripheral flange defining a recess. The housing has a plurality of tapered apertures directed from the top surface within the recess to a bottom surface with the diameter of each aperture being larger at the top surface than at the bottom surface. A separate terminal pin is located in each aperture and is bonded to the header by means of a glass bond which insulates the pin from the header. A metal diaphragm is coupled to the peripheral flange and a pressure sensor is located within the recess. The pressure sensor has terminals connected to the pins located in the tapered aperture. The recess is filled with oil for coupling pressures or forces imparted to the metal diaphragm to the sensor. The tapered apertures allow the unit to withstand high pressures which normally would cause the pins to rupture or dislodge from the housing.

9 Claims, 3 Drawing Figures

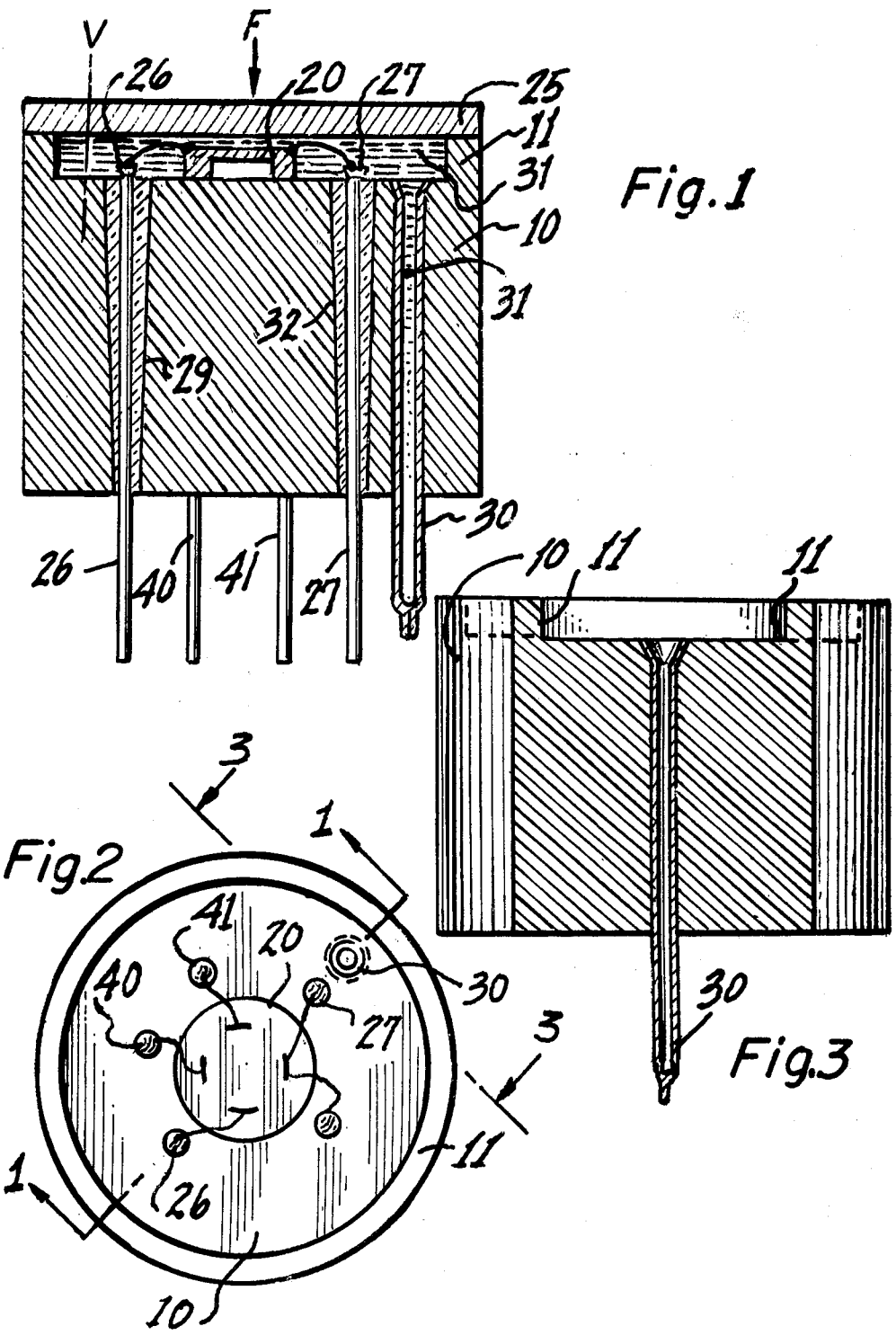

OIL FILLED PRESSURE TRANSDUCERS

BACKGROUND OF INVENTION

The present invention is generally related to a pressure transducer and more particularly to a pressure transducer employing a fluid as oil for transfering pressure to a diaphragm.

Essentially, pressure transducers are well-known and many different types exist in the prior art. Many of these transducers employ piezoresistive elements or sensors which are disposed on a diaphragm and which when subjected to a force or pressure exhibit a change in resistance.

Essentially, such devices have been used with oil which oil or fluid is employed as a force transmitting medium. In such devices the pressure applied to the diaphragm or transducer is normally quite large and therefore these devices employ a metal diaphragm as a force collector. The metal diaphragm communicates with a silicon pressure transducer through an oil filled reservoir which is manifested by an internal hollow in the transducer housing.

In any event, the force imparted on the metal diaphragm can cause pressures inside the transducer which are large enough to dislodge the terminal pins and to rupture or break the transducer assembly. In fact the most common area of destruction due to large pressures in transducers is the virtual "blow out" of the terminal pins. This problem has not been adequately solved by any prior art device. There are of course transducers which have been designed and used for high pressure or differential pressure operation using oil filled cavities.

U.S. Pat. No. 4,177,680 entitled Dual Pressure Sensor issued on Dec. 11, 1979 to Coleman. This patent employs two oil filled enclosures which are separated by a substrate and which transducer provides a differential output upon the application of a pressure.

Other patents which involves pressure transducers operating in various environments are U.S. Pat. No. 2,507,501, U.S. Pat. No. 3,507,099 and U.S. Pat. No. 4,068,527.

The above patents are representative of certain types of pressure transducers but in any manner do not solve or disclose the above noted problem which is manifested by the rupture or force removal of terminal pins when a fluid filled transducer is subjected to high pressure.

BRIEF DESCRIPTION OF THE PREFERRED EMBODIMENT

A pressure transducer comprising a housing having a top peripheral flange surrounding a top surface area of said housing defining a recess, said housing having a plurality of tapered apertures directed from said top surface area to said bottom surface area with the diameter of said apertures being larger at said top surface than at said bottom surface, a plurality of terminal pins each separate one located coaxially in one of said apertures and means for insulatively bonding said pins within said apertures with said pins extending below said bottom surface and a pressure sensor located on said top surface and having terminals coupled to said pins, a diaphragm secured to said peripheral flange to cover said top surface area, a fluid transmitting medium located within said recess.

BRIEF DESCRIPTION OF THE FIGURES

FIG. 1 is a side cross-sectional view taken through line 1—1 of FIG. 2 of a transducer according to this invention.

FIG. 2 is a top plan view of a transducer according to this invention.

FIG. 3 is a cross-sectional view taken through line 3—3 of FIG. 2.

DETAILED DESCRIPTION OF THE INVENTION

Referring to FIG. 1, there is shown a cross-sectional view of a pressure transducer according to this invention. The pressure transducer is contained within a metal housing or header 10. The header 10 has a top surface which is surrounded by a lip or peripheral flange 11. A pressure sensor 20 is located on the top surface of the header 10 in a relatively central position and is surrounded by the lip or flange 11.

Essentially, the pressure sensor comprises a semiconductor diaphragm of an inverted "U" shaped configuration having located on a surface, and within the active area, a piezoresistive bridge array. Such arrays are well-known in the art and for example see U.S. Pat. No. 3,654,579 entitled Electromechanical Transducers and Housings issued on Apr. 4, 1972 to Kurtz, et al. and assigned to the assignee herein. This patent depicts various structures of bridge circuits.

In FIG. 2, there is shown a top view of the header 10 with the metal diaphragm removed.

Referring back to FIG. 1, located and secured to the top side of the lip 11 is a metal diaphragm 25. The diaphragm 25 may be fabricated from stainless steel or some other material and is secured to the metal header 10 by means of a weld or other metal to metal seal.

As seen in FIGS. 1 and 2, the terminals of the pressure sensor 20 are directed via leads as 33 to terminal pins as 26 and 27. The terminal pins are located in tapered apertures as 29 and 32. The tapered apertures have a larger diameter at the top surface of the header and a smaller diameter at the bottom surface of the header. The terminal pins 26 and 27 are inserted coaxial with the large and small diameters and are secured in place by means of a glass bond.

As seen in FIG. 1, a glass material is inserted into the holes as 29 and 30 and bonds the terminal pins 26 and 27 to the header. Many different types of glasses can be used such as various types of solder glass and other high temperature glasses which are known in the art.

Essentially, as can be seen from FIG. 1, the glass bond serves to provide insulation between the terminal pins and the header. Each aperture as 29 and 32 and pin 40 and 41 are accomodated within the header in the exact manner as shown for pins 26 & 27. The top ends of the pins 26 & 27 may have a flattened surface and hence the pins may appear similar to a nail such as those used in wood working or may be of a relatively constant diameter.

A tube 30 has a top flared end and serves as an access port for introducing oil or fluid 31 into the recess. Once the oil is inserted into the recess, the tube 30 is crimped or closed to maintain the oil within the recess.

As one can see, when a pressure or force is impressed upon the metal diaphragm 25, the oil as located in the recess transmits the force to the pressure sensor 20. As indicated, in many operating environments, great pressures occur and these pressures are of such a magnitude that they serve to force the pins as 26 and 27 out of the header. Such forces also serve to push the oil port or tube 30 out of the header. In the configuration shown this cannot occur.

In the housing configuration of FIG. 1 a force which tends to push the pin 26 out of the header 10 will actually, due to the taper, serve to locate the pin more firmly within the header. Due to the taper a downward force as "F" is distributed by the taper throughout the width of the header and hence the pins cannot be dislodged as in prior art devices.

As shown in FIG. 3, the tube 30 also has a top flared end which communicates with the recess containing the oil. The top flared end of the oil filled port also acts to retain the oil filling tube in position when large forces "F" are applied to the diaphragm 25.

Thus as shown in FIG. 1, the oil port or tube 30 is positioned on the same plane as the terminal pins 26 and 27. The oil port has a flared top at the position of the recess. Each pin is located in a tapered hole as shown in FIG. 1 where the angle of the taper from the vertical axis "V" is between 5 to 20 degrees. By using such a housing configuration the entire transducer structure can be extremely small and yet be capable of accomodating higher pressures without causing a rupture of the device due to pin or oil port blow out.

I claim:

1. An oil filled pressure transducer comprising:
a housing having a top peripheral flange surrounding a top surface area of said housing defining a recess, said housing having a relatively flat bottom surface area, said housing having a plurality of tapered apertures directed from said top surface area to said bottom surface area with the diameter of said apertures being larger at said top surface than at said bottom surface, a plurality of terminal pins each separate one located coaxially in one of said apertures with each of said terminal pins having a relatively flat head of a larger diameter than the diameter of the body of said pin with said flat heads positioned above said top surface area and means for insulatively bonding said pins within said apertures with said pins extending below said bottom surface and a pressure sensor located on said top surface and having terminals coupled to said pins, a diaphragm secured to said peripheral flange to cover said top surface area, a fluid transmitting medium located within said recess, said housing further containing a fluid receiving tube having a top flared end communicating with said top surface area and having a bottom end extending below said bottom surface for introducing said fluid transmitting medium to said recess.

2. The pressure transducer according to claim 1 wherein said housing is fabricated from metal.

3. The pressure transducer according to claim 1 wherein said means for insulatively bonding said pins within said apertures is a glass bond.

4. The pressure transducer according to claim 1 wherein said diaphragm is a metal diaphragm.

5. The pressure transducer according to claim 1 wherein said pressure sensor is a piezoresistive sensor configuration.

6. The pressure transducer according to claim 1 wherein said fluid medium is oil.

7. The pressure transducer according to claim 1 wherein said terminals of said sensor are coupled to said pins via leads.

8. The pressure transducer according to claim 3 wherein said glass bond is a solder glass bond.

9. The pressure transducer according to claim 1 wherein said angle of taper of said aperture is between 5 to 20 degrees from the vertical.

* * * * *